June 3, 1958

R. F. MIELKE ET AL 2,836,905

GLIDE PATH INDICATING DEVICE FOR USE
IN GROUNDED TRAINING SYSTEMS

Filed Feb. 24, 1955

INVENTORS
ROBERT F. MIELKE
LAWRENCE E. REDMOND
BY
Kasper T. Serijan AND
Wade
ATTORNEYS June 3, 1958  R. F. MIELKE ET AL  2,836,905
GLIDE PATH INDICATING DEVICE FOR USE
IN GROUNDED TRAINING SYSTEMS
Filed Feb. 24, 1955   3 Sheets-Sheet 2

INVENTORS
ROBERT F. MIELKE
LAWRENCE E. REDMOND
BY
Kasper T. Serijan
AND
Wade Koontz
ATTORNEYS.

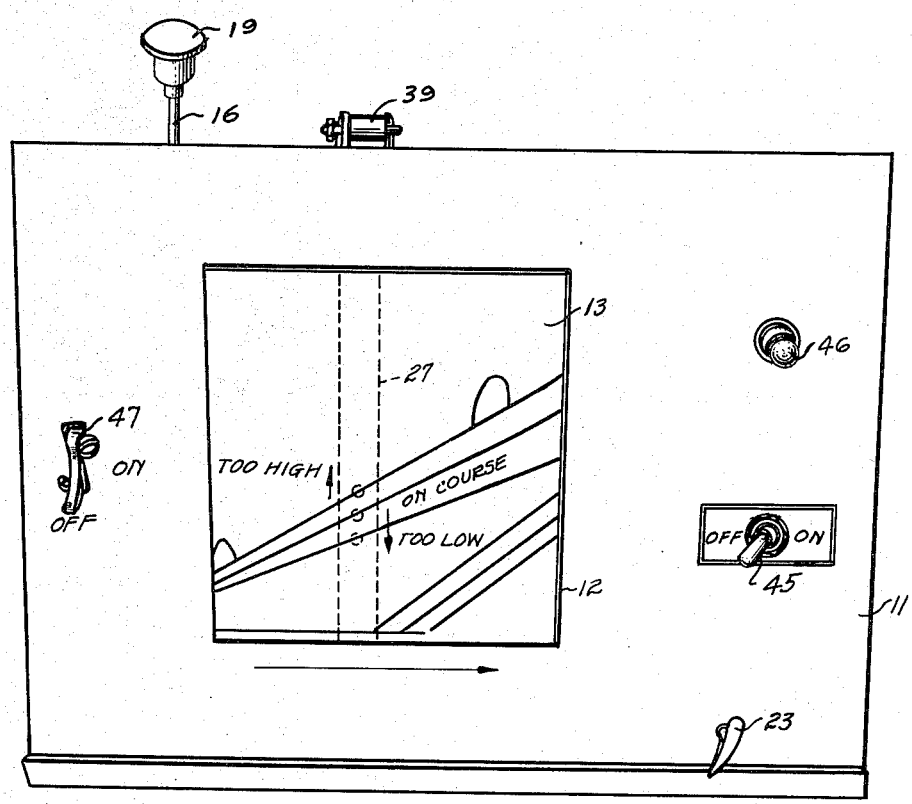
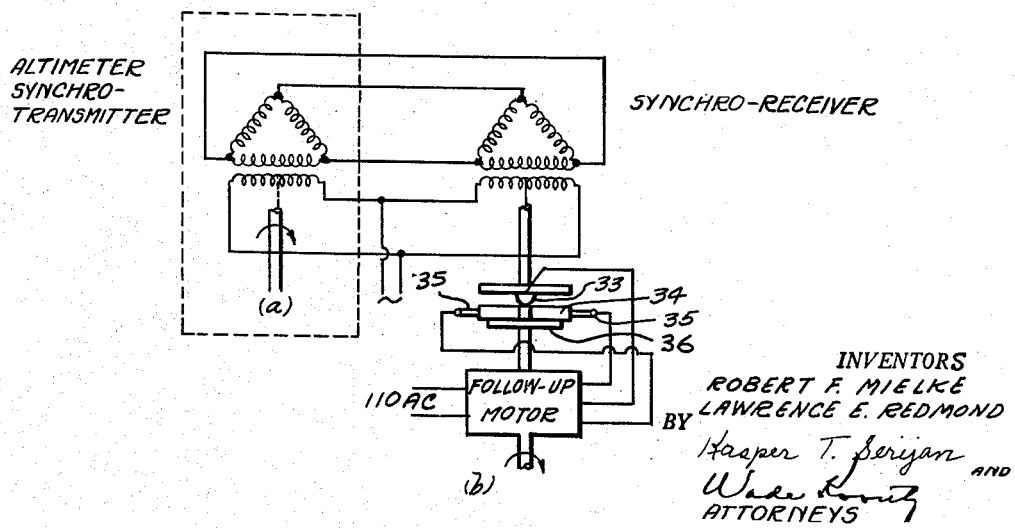

United States Patent Office 2,836,905
Patented June 3, 1958

2,836,905
GLIDE PATH INDICATING DEVICE FOR USE IN GROUNDED TRAINING SYSTEMS

Robert F. Mielke, Wampum, Pa., and Lawrence E. Redmond, Newberry, Mich.

Application February 24, 1955, Serial No. 490,438

6 Claims. (Cl. 35—12)

(Granted under Title 35, U. S. Code (1952), sec. 266)

The invention described herein may be manufactured and used by or for the United States Government for governmental purposes without payment to me of any royalty thereon.

This invention relates to pilot training devices and more particularly to a glide path indicating device for use in conjunction with a grounded training system such as a link trainer wherein simulated flight conditions are involved. The device of the present invention is especially useful for automatically and visually indicating the position of the training craft relative to a predetermined glide path being followed by a student pilot during a simulated landing operation. By utilizing the improvement herein described in conjunction with available equipment for visually reproducing the azimuth relation of the craft relative to the landing strip, a means is provided for closely simulating actual landing operations using a ground controlled approach system.

Ground controlled approach (GCA) in actual landing operations involves the use of radar to locate the aircraft when it enters or approaches the control zone and to give accurate information for lateral and vertical guidance of the craft during its landing on the runway. Apparatus for this purpose includes so-called GCA indicators which provide an accurate visual presentation relative to the azimuth and elevation of the craft at any time during its approach and landing. With such information available to the ground observer at all times during the approach and landing, he is in a position to "talk-down" the craft using direct communication with the pilot.

For training purposes wherein a grounded training system is employed, the position of the craft in a simulated landing operation cannot be depicted by radar on GCA indicators as in actual flight. Accordingly, other means are required for defining the position of the approaching or landing aircraft if the instructor or observer is to be sufficiently informed throughout the entire operation to accurately "talk-down" the training craft being operated by the student pilot.

Devices of various types for recording the ground track of training devices in simulated flight are available for use and are commonly referred to as recorders or "crabs." In addition to devices used under conditions assuming no wind corrections, recorders adapted for taking into consideration variations in air speed and craft heading because of assumed wind conditions are also known as described, for example, in U. S. Patent No. 2,332,523. Such devices which trace or otherwise indicate the true simulated ground track of the trainer are suitable for providing the ground observer with the necessary azimuth information whereby lateral guidance for ground control approach operation of grounded trainers may be communicated.

Whereas several types of glide path simulating devices for specific training applications are available including various tracing mechanisms, simulated glide path beams and the like, no satisfactory vertical position indicating device comparable to a GCA elevation indicator (EPI scope elevation) which produces a pip on a radarscope is available for student training in ground controlled approach system operations utilizing C-8 trainers or similar grounded training systems. The available devices are generally of insufficient accuracy or do not provide adequately clear visibility of the exact position such that the precise information required for GCA training is not readily determinable. Inking or tracing devices, in particular, produce considerable viewing difficulties for the observer since the exact position of the craft is frequently either partially or wholly obscured from view by the inking wheel or related supporting structure. Other devices are available which are not of an entirely automatic nature and are accordingly undesirable for reasons which are obvious.

The present invention provides an entirely automatically operating device including a viewing screen which presents a clear visual indication of the desired information in a manner closely resembling the appearance and operation of a pip on a radarscope. Thus, the position of the grounded training craft relative to its altitude and deviation from a predetermined glide path drawn upon the screen is made clearly visible to the ground observer (instructor) at all times throughout the simulated landing operation. At the same time, a relatively simple and inexpensive glide path indicating device of considerably improved accuracy is made available which can be readily adapted for use with existing trainer units of the C-8 type without any substantial alteration of the trainer equipment. The use of the device is not confined solely to ground controlled approach operations since other types of flight and landing operations require the provided information. The equipment may be used as an attachment to a C-8 trainer or incorporated into the instructor's desk as desired.

It is therefore an object of this invention to provide an automatically operating glide path indicator which is particularly suitable for GCA training using a grounded training system of the Link type whereby a ground observer can readily obtain the necessary information to provide vertical guidance to the student pilot.

It is a further object of this invention to provide a glide path indicating device having improved accuracy and facilitated observability whereby GCA training for student pilots can be provided in an improved and more realistic manner.

It is another object of this invention to provide a glide path indicating device for use in conjunction with grounded trainer systems which can be readily attached or removed from the basic unit with minimum difficulty.

Other objects and advantages will become apparent from the specification, taken in connection with the accompanying drawings wherein one embodiment of the invention is illustrated.

The automatically operating apparatus hereinafter described in detail consists of a device capable of visually presenting accurate information to either or both the instructor and the student pilot as to whether or not the trainer is correctly following the GCA glide path during landing operations relative to the simulated altitude and vertical deviation from a predetermined glide path being followed by the trainer. The device comprises a viewing scope upon which two tapes in a superimposed relation are moved in normal relation to each other. One tape herein referred to as a screen has the glide path drawn thereon and is moved across the viewing scope in a direction and at a rate of speed corresponding to the ground speed of the trainer. In this manner, the movement of the screen past a stationary vertical reference line on the viewing scope indicates the rate of descent required to properly land the craft at the given ground speed. The second tape, designated as a strip to distinguish the same from the screen, is provided with an aperture through which a beam of light can be transmitted onto the moving screen adjacent thereto. By aligning the strip such that the position of the light spot on the screen corresponds to the simulated altitude of the trainer in approach position and further making the vertical motion of the strip along the reference line responsive to the simulated changes in altitude of the trainer during the landing as determined by the student's manipulation of the elevation controls, the viewing scope provides a pip effect somewhat similar to that produced by the conventional GCA elevation indicator. Thus, by observing the relationship of the light spot to the glide path during the simulated landing, the instructor can immediately determine whether or not altitude corrections are required and can communicate with the student pilot accordingly.

This invention may be more fully understood by reference to the appended drawings wherein:

Fig. 1 is a perspective view showing one embodiment of the glide path indicator assembly adapted for mounting on the instructor's desk.

Fig. 3 is a perspective view of the viewing scope of the glide path indicator.

Fig. 4 is a schematic diagram of the electrical circuit of the servo-mechanism used in operating the altitude indicating element of the device.

Figure 2:
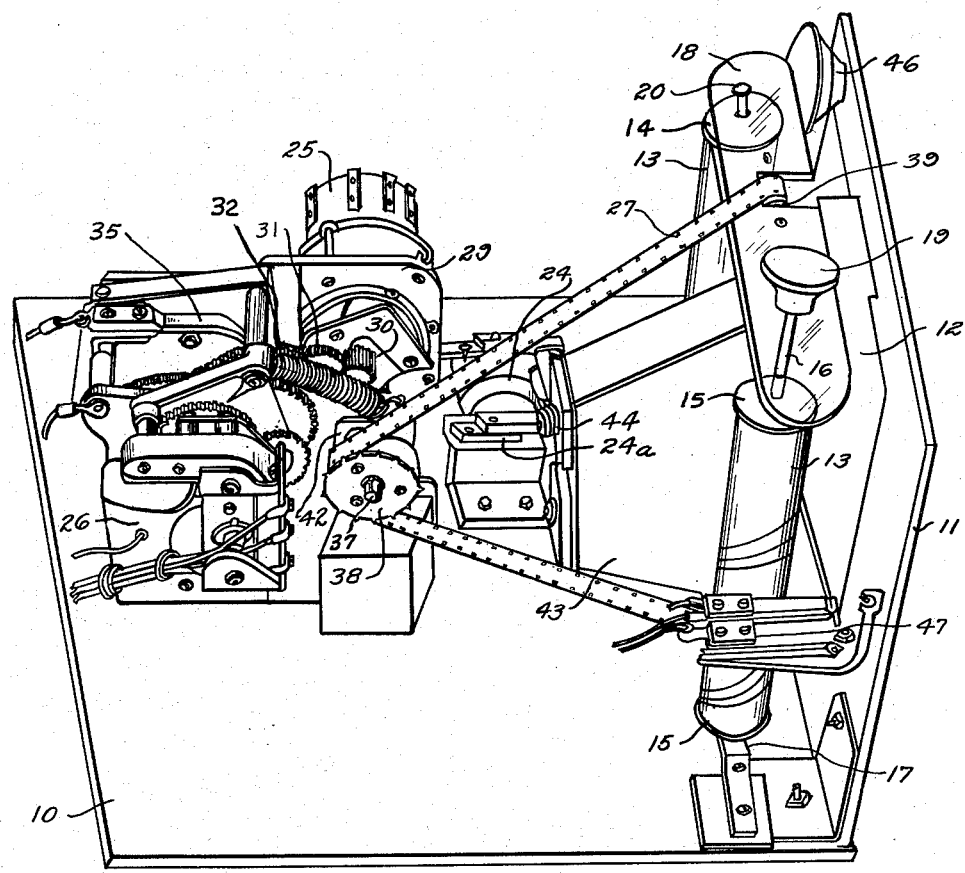
Fig. 2 is another perspective view of the same embodiment from an elevational position.

Referring now to Figs. 1 through 3 wherein similar characters of reference are used to indicate corresponding parts, a supporting structure consisting of base 10 and panel 11 is provided, the latter having a cutaway portion forming viewing scope 12 most clearly shown in Fig. 3. Screen 13 having one or more glide paths delineated thereon and consisting preferably of a transparent paper or other suitable material for allowing the penetration of a light beam therethrough is supported on rollers including driving roller 14 and driven roller 15. Shaft 16 positioned and supported at one end by means of retainer strip 17 attached to base 10 and near its opposite end by apertured bracket 18 attached to panel 11 provides free rotation of roller 15 for traversing screen 13 across viewing scope 12 thereby winding said screen upon roller 14. Knob 19 facilitates rewinding of the screen upon the driven roller for the purpose of resetting the glide path. Driving roller 14 positioned along the second vertical edge of the viewing scope is similarly supported by shaft 20 mounted at one end in bracket 18 and at the other end by an adjustable retainer strip 21. Roller 14 differs from roller 15 in that a driving element such as a gear 22 is provided on the shaft of the driving roller for engaging the rotary motion transmitted from the screen-driving motor. Lever 23 connected to adjustable retainer strip 21 provides a convenient method for shifting the position of the driving roller so as to disengage gear 22 whereby the screen may be rewound on roller 15 as previously indicated.

The revolving glide path is driven by a synchronous motor 24 adjustably mounted on base 10 by means of brackets 24(a). Preferably, a 1 R. P. M. telechron motor wired to the microswitch of the ground-speed drive of the trainer in parallel arrangement with the wiring of the recorder so that the speed of the glide path screen will always be in a direct ratio with the simulated wind direction and velocity. Since the circuit which supplies the alternating current to the drive motors of the recorder in conventional equipment is made intermittent with direct current to obtain variable recorder speed to simulate varying ground speed, the aforesaid wiring arrangement provides the same relative rate of movement for the screen upon the rollers. The motor shaft gearing engaging gear 22 of the driving roller is adapted to produce horizontal travel of the glide path screen a distance (ground speed) corresponding to a typical landing airspeed as for example, an indicated airspeed of 120 M. P. H. under no wind conditions for a period of three minutes. Any wind encountered on final approach, however, will automatically change the speed of the glide path screen accordingly and the student pilot must make the necessary adjustments to maintain the proper rate of descent as defined by the designated glide path. The operation of the glide path screen and related components is entirely automatic with the exception of the rewinding step.

The main elements of the altitude indicating component of the present invention comprise (a) a synchro-receiver 25, (b) a reversible electric motor 26 of the type commonly used for amplifying torque of angular mechanical functions, (c) an apertured strip 27 for following the mechanical movement of the follow-up motor and (d) the necessary supporting structure and gearing to associate and integrate the angular motion from the synchro-transmitter of the trainer's altitude vertical-speed transmitter assembly with movement of the altitude-indicating tape or strip of this invention.

The altitude-vertical-speed transmitter assembly of a C-8 Link trainer includes an altimeter synchro-transmitter which progressively actuates the altimeter of the trainer to indicate simulated altitude under various conditions of operation. By connecting synchro-receiver 25 in parallel arrangement with the altimeter-operating synchro-receiver of the assembly, a synchronized mechanical motion is derived which corresponds to the simulated altitude changes of the trainer as indicated by the altimeter readings. By utilizing a reversible follow-up motor 26 associated with synchro-receiver 25, in conjunction with the necessary gearing etc., it becomes possible to move strip 27 in a direction and to an extent which proportionately reflects the changes indicated in the altimeter of the trainer. A wiring circuit satisfactory for the aforesaid purpose is schematically presented in Fig. 4 wherein the portion inclosed by the dotted lines indicates elements included in the trainer's altitude vertical-speed transmitter assembly and the angular motion of shaft (a) corresponds to the function actuating the altimeter of the trainer and shaft (b) represents the corresponding amplified torque.

As shown in Figs. 1 and 2, synchro-receiver 25 may be supported in any desirable relation to the reversible electric motor. In the embodiment shown, a 110-volt follow-up motor of the shaded-pole induction type having a rotary control switch is fixedly positioned on base 10 by angle support 28 upon which bracket 29 supporting synchro-receiver 25 is mounted. The angular rotation of the synchro-receiver shaft is transmitted by suitable gearing indicated herein as pinion gear 30 communicating with gear 31 to move gear 32 having a spring mounting button contact 33 on its surface facing the reversible motor (see Fig. 4).

The button contact which comprises one side of the rotary switch rides over an insulated two-plate section disc 34 which serves as the other side of the switch. The contact point side of the switch is grounded and each section of the disc is connected through brushes 35 to the clockwise and counterclockwise terminal respectively of the motor. The plate section over which the contact point rides determines which pair of shading coils will be grounded, thus determining the direction in which the motor will run. The plate sections are fastened to an insulating disc 36 that is driven by the motor so that the angular position of this side of the switch is determined by the motor. Since the synchro-receiver determines the angular position of the contact point side of the switch, the direction and length of time the follow-up motor operates depend upon the angular positions of the two sides of the switch with respect to each other. When the contact point is touching both plate sections, the motor will not operate as both pairs of shading coils are grounded and act to brake the motor. However, when the contact point is rotated so that it is in contact with only one plate section, only one pair of the shading coils is grounded, and the motor starts operating in the proper direction to drive insulating disc 36 to the position where both plates are touching the contact point. When this occurs, both pairs of shading coils are again grounded and the motor immediately stops. Thus the motor drives the plate side of the rotary control through the same number of degrees and in the same direction that the contact side of the switch is rotated.

Similarly, a leaf-type of switch and cam used on follow-up motors for performing the same type of function can be adapted for use in accordance with the present invention if desired.

Any suitable gear train of the type conventionally used in connection with follow-up motors may be used for transferring the output of the follow-up motor to shaft 37 upon which driving spool 38 is keyed. Driven spools 39 and 40 mounted on bracket 18 and base 10 respectively support apertured strip 27 preferably in the continuous form shown in Figs. 1 and 2, tensioned by means of spring 41 attached to support 28 and driving spool bearing assembly 42. Strip 27, preferably consisting of a black film is run through slots in the top and bottom of an otherwise inclosed chamber 43 illuminated by two 110 v. 6 w. bulbs 44, as shown in Fig. 2, powered by the alternating current from the ground-speed micro switch.

A small hole along the center line of strip 27 is aligned with respect to viewing scope 12 so as to correspond to the simulated altitude of the trainer. For practice landings, altitudes from zero feet up to 1500 or 1600 feet are generally sufficient and the screen may be calibrated to correspond thereto. A comonly used glide path for the purpose herein discussed utilizes a rate of descent of 500 feet/minute for 3 minutes at 120 M. P. H. under no-wind conditions, although a glide path suitable for other approach altitudes and rates of descent can be drawn on the screen as desired. Once the altitude indicator or pip is positioned in its calibrated superimposed relation with the screen, it will automatically line up with the altitude of the trainer when the reversible follow-up motor is turned on. The panel as shown in Fig. 3 contains toggle switch 45 and indicator light 46 for the operation of the screen by synchronous motor 24, and switch 47 controlling the operation of the altitude indicating tape.

For operating the apparatus, the unit need not be turned on until the trainer is on the base leg of the approach so as to allow for the follow-up motor to align the pip with the indicated altitude of the trainer. As the trainer turns on final and aproaches the 6-mile range, the glide path rollers are turned on and the pilot is instructed to start his descent. The pip on the screen will follow the trainer's altitude down while the glide path moves at a speed directly proportional to the ground speed of the trainer. Errors as little as ten feet can be easily detected representing a very substantial improvement in accuracy over heretofore available devices for the purpose.

While in the foregoing specification this invention has been described in relation to a preferred embodiment thereof and specific details of this embodiment have been set forth for the purpose of illustration, it will be apparent to those skilled in the art that this invention is susceptible to other embodiments and that many of the details herein set forth can be varied considerably without departing from the basic concept of the invention.

We claim:

1. A glide path indicator for use in conjunction with a grounded training system comprising a substantially transparent screen having a glide path delineated thereupon and a substantially opaque altitude-indicating strip arranged in a normal and superimposed relation to each other, means for moving said screen in a horizontal direction at a rate of speed corresponding to the simulated ground speed of the trainer, an aperture provided in said strip for permitting the passage of a beam of light therethrough onto said screen, illuminating means associated with said strip for providing said beam of light and means for aligning the aperture segment of the strip relative to the glide path on said screen for indicating the simulated altitude of the trainer thereon and for moving said strip in a vertical direction corresponding to the changes in altitude of said trainer following said glide path.

2. The apparatus of claim 1 wherein the means for moving said screen comprises a pair of rollers including a driving roller and driven roller, said driving roller being actuated by means of a gearing system responsive to the output shaft of a synchronous motor wired to the ground speed drive of the trainer.

3. The apparatus of claim 1 wherein the means for aligning and moving the apertured strip comprises a synchro-receiver connected in parallel arrangement with the synchro-receiver of the trainer unit operating the altimeter thereof, said first synchro-receiver being associated with a follow-up motor for amplifying its torque and thereby operating a driving spool carrying said strip.

4. A glide path indicator for use with a grounded training system comprising a screen having a predetermined glide path delineated thereon, a constant speed motor connected with the ground speed drive of the trainer adapted to move the screen horizontally at a rate of speed corresponding to the simulated ground speed of the trainer, an apertured strip supported in part in a superimposed relation with said screen and adapted to move in a vertical direction relative to the motion of the screen, a light source associated with the apertured strip and adapted to transmit a beam of light through the aperture and onto said screen, a servo-mechanism connected to the altimeter-operating mechanism of the trainer responsive to changes in the simulated altitude of the trainer whereby the apertured segment of the strip may be aligned and moved to indicate the altitude of the trainer on the screen relative to the glide path thereon, said servo-mechanism being adapted for moving the strip in a direction and at a rate corresponding to the simulated change in altitude of the trainer.

5. A device for automatically indicating the glide path position of a grounded training system during a landing operation wherein a ground controlled approach system is simulated in response to controls manipulated by the student pilot in the trainer, said device comprising a screen having glide path indicated thereon, rollers for supporting said screen including a driving and driven roller, electrical means responsive to the ground speed drive of the trainer, said means being adapted to undirectionally move the screen at a rate of speed corresponding to the simulated ground speed of the trainer, an apertured continuous strip arranged in normal relation to said screen and supported on spools including a driving spool and at least one driven spool, a servo-mechanism for actuating said driving spool, said servo mechanism being connected with the altitude control of the trainer and adapted to move the driving spool and the strip supported thereon in a direction and at a rate corresponding to changes in altitude of the trainer as indicated on the altimeter thereof, and an illumination source for transmitting a beam of light through the apertured portion of said strip onto said screen.

6. The device of claim 5 wherein the servo-mechanism includes a synchro-receiver operating in conjunction with a reversible follow-up motor of the type having a rotary control switch for actuating said apertured strip.

References Cited in the file of this patent

UNITED STATES PATENTS

| | | |
|---|---|---|
| 2,131,952 | House | Oct. 4, 1938 |
| 2,313,480 | Reid | Mar. 9, 1943 |
| 2,350,351 | Grunberg | June 6, 1944 |
| 2,442,297 | Link | May 25, 1948 |
| 2,526,682 | Mulberger et al. | Oct. 24, 1950 |
| 2,705,769 | Cooper | Apr. 5, 1955 |

OTHER REFERENCES

Jones et al.: Pictorial Display in Aircraft Navigation and Landing, Proceedings of the I. R. E., April 1950, pages 391 to 400.